US005274839A

United States Patent [19]

Kularajah et al.

[11] Patent Number: 5,274,839

[45] Date of Patent: Dec. 28, 1993

[54] SATELLITE COMMUNICATIONS SYSTEM WITH THE ZERO-DB COUPLER

[75] Inventors: Ratnarajah Kularajah, Hamilton Square; Krishna Praba, Cherry Hill, both of N.J.

[73] Assignee: General Electric Co., East Windsor, N.J.

[21] Appl. No.: 834,587

[22] Filed: Feb. 12, 1992

[51] Int. Cl.[5] .......... H04B 1/59

[52] U.S. Cl. .......... 455/12.1; 333/113; 333/117; 370/75

[58] Field of Search .......... 333/109, 117, 113, 114; 455/12.1, 13.1, 13.3; 370/123, 75; 392/353

[56] References Cited

U.S. PATENT DOCUMENTS

| | | | |
|---|---|---|---|
| H 880 | 1/1991 | Patin | 333/117 X |
| 3,044,026 | 7/1962 | Patterson | 333/113 |
| 4,706,239 | 11/1987 | Ito et al. | 370/75 X |
| 4,872,015 | 10/1989 | Rosen | 455/13.3 X |
| 4,906,952 | 3/1990 | Praba et al. | 333/22 |
| 4,989,011 | 1/1991 | Rosen et al. | 342/373 |
| 5,025,485 | 6/1991 | Csongor et al. | 455/12.1 |

FOREIGN PATENT DOCUMENTS

| | | | |
|---|---|---|---|
| 94505 | 5/1985 | Japan | 333/113 |
| 643984 | 10/1950 | United Kingdom | 333/113 |

OTHER PUBLICATIONS

"Beam Forming Networks for Satellite Applications", by Praba et al., pp. 57–59, 5th Annual Benjamin Franklin Symposium, May 24, 1985.

Reed, John; "Branch Waveguide Coupler Design Charts"; *The Microwave Journal;* Jan. 1963; pp. 103–105; Copy in 333/113.

*Primary Examiner*—Benny T. Lee

*Attorney, Agent, or Firm*—W. H. Meise; C. A. Berard; S. A. Young

[57] ABSTRACT

A zero-dB hybrid or directional coupler includes a first through waveguide extending between first and third ports and a second through waveguide, parallel to the first waveguide, and extending between second and fourth ports. A plurality of branch waveguides extend between the first and second through waveguides, and are adjusted to couple signal from the first port only to the fourth port, and from the second port only to the third port (within in limits of systems isolation). Particular normalized branch line impedances provide best operation. A communication system especially adapted for use as a spacecraft uses a zero-dB coupler in a "planar" waveguide system to transpose or "crossover" the positions of two system ports, whereby the physical positions of the various ports are arranged in the same relation as their phase progression.

7 Claims, 10 Drawing Sheets

SATELLITE COMMUNICATIONS SYSTEM WITH THE ZERO-DB COUPLER

BACKGROUND OF THE INVENTION

This invention relates to satellite communications systems, and particularly to coupling arrangements using a zero dB hybrid or directional coupler.

An important aspect of modern business relies upon inter and intra-continental communications, large amounts of communications traffic are carried by communication satellites. Many such satellites are in use, and new satellites are currently fabricated for new applications and for replacement purposes. The fabrication and launch of a communications satellite tend to be capital-intensive, and improvements which increase the reliability and life of a spacecraft, improve its performance or reduce its cost, are desirable.

FIG. 1 illustrates a simplified communications satellite 10 orbiting about the earth 8. Satellite 10 includes a body 12, a pair of solar panels 14*a* and 14*b* for powering the spacecraft, and a transmit-receive communications antenna 16. Antenna 16 receives signals from one or more earth stations, processes the signals and repeats the information, often at a different carrier frequency, back toward the same and/or other earth stations. Identical reference labels in different drawings reflect identical elements earlier described.

FIG. 2*a* illustrates, in simplified block diagram form, a communication system which may be used in conjunction with satellite 10. In FIG. 2*a*, an antenna illustrated as 216*a* represents a portion of the receiving section of antenna 16 of FIG. 1. For example, antenna 216*a* of FIG. 2*a* may represent a vertically-polarized (as opposed to horizontally-polarized) receiving portion of antenna 16. The signals received by antenna 16 of FIG. 1 may include a plurality of information channels in adjacent frequency bands extending over a cumulative frequency band such as 13.5 to 14.0 $GH_z$. Each individual channel may have a bandwidth, for example, of 6 $MH_z$, which might be sufficient to carry a standard television channel or a plurality of multiplexed telephone or data subchannels. Each channel can be separated from the channels on adjacent frequencies by frequency filtration. In order to reduce channel interaction, each channel, as transmitted to antenna 16, is at a polarization orthogonal to that of the adjacent-frequency channels.

Antenna 216*a* couples signals received with a vertical polarization to a receiver 212, which may include, for example, a bandpass filter (BPF) 214 covering the cumulative bandwidth, a low noise amplifier (LNA) 216, and a frequency converter including a mixer 218 fed with local oscillator (LO) signals from a source (not illustrated). The received signals are applied from receiver 212 to a demultiplexer illustrated as a block 220. The frequency-converted signals at the input of demultiplexer 220 include a plurality of semi-adjacent channels, since the horizontally-polarized adjacent channels are discriminated against by vertically polarized antenna 216*a*. The cumulative bandwidth of the converted signals may be, for example, 11.7 to 12.2 $GH_2$, and within that bandwidth, a plurality of channel spectra may be included, centered at frequencies designated as $f_1, f_2, f_3, f_4 \ldots$ in FIG. 2*b*. They are not designated $f_1, f_3, f_5 \ldots$, because the adjacent horizontally polarized signal channels are ignored in relation to the discussion of FIG. 2*a*. While the down-converted signals produced by receiver 212 could in principle be amplified together, by a broadband amplifier, before transmission back to the earth, the nonlinearities of amplifiers are such that intermodulation distortion might degrade the signals at the desired output signal amplitudes (levels). In order to amplify the signals to the desired level without intermodulation distortion, they are separated into individual channels for amplification by individual amplifiers. Distortion occurs in the individual amplifiers, but may be manifested more as a compression, which can be ameliorated by a predistortion equalizer (not illustrated) in each channel.

Demultiplexer 220 filters the signals into separate channels in accordance with frequency. For example, signals about "odd" frequency $f_1$ of FIG. 2*b* are coupled into a channel $F_1$, signals at "even" frequency $f_2$ are coupled, into a channel $F_2, \ldots$, signals at even frequency $f_{2N}$ are coupled into channel $F_{2N}$, and signals at odd frequency $f_{2N+1}$ are coupled into channel $F_{2N+1}$. A plurality of amplifiers 222*a*, 222*b*, 222*c* . . . 222*d*, 222*e* are associated with output channels $F_1, F_2, F_3 \ldots F_{2N}, F_{2N+1}$, respectively, of demultiplexer 220. As is well known to those skilled in the art, a redundancy scheme (not illustrated) may be used for substitution of spare amplifiers in the event of a failure, or for using remaining amplifiers for higher priority uses rather than lower priority uses, as described in U.S. patent application Ser. No. 07/772,207, entitled "Multichannel Communication System with an Amplifier in each Channel," filed on or about Oct. 7, 1991 in the name of H. J. Wolkstein.

The separately-amplified signals in each channel $F_n$ of FIG. 2*a* must be re-multiplexed by combining in order to allow transmission by a single antenna arrangement. Just as the effective skirt selectivity or channel isolation of demultiplexer 220 is improved by applying only semi-adjacent channels for demultiplexing into channels $F_1$-$F_{2N+1}$ (where the hyphen represents the word "through"), the multiplexing of the vertical channels $F_1$-$F_{2N+1}$ is improved if the channels to be multiplexed are separated in frequency as much as possible. Thus, for improved skirt selectivity, channels $F_1$-$F_{2N+1}$ are recombined or multiplexed by a pair of multiplexers 224E (even), 224O (odd). Odd channels (also called "odd-mode" channels) $F_1, F_3 \ldots F_{2N+1}$ are applied to multiplexer 224O, and even channels $F_2, F_4 \ldots F_{2N}$ ("even-mode") are applied to multiplexer 224*e*. Each multiplexer 224 combines the signals received from its respective channels onto one of two combined transmission paths 226O and 226E.

If the multiplexed signals from all the channels were available on a single transmission path rather than on transmission path pair 226O, 226E, the signals could be applied to the transmit antenna (represented by feedhorns 216B, 216C, 216D and 216E) by way of a power divider or coupler having a single input port. Feedhorns such as 216*b*-216*e* may be used, as known, in conjunction with a reflector in order to aid in directing beam portions over a desired area, such as a continental area. However, since the signal to be transmitted is generated, as described, on two separate transmission lines 226O and 226E in order to provide increased filter skirt selectivity in multiplexers 224, a "two" port coupling arrangement to the transmitting antenna arrangement must be provided. The two-input-port feature is provided by a coupling arrangement illustrated as a block 228 in FIG. 2*a*. The odd channel signals on path 226O are applied to an input port 1 of block 228, and the even channels on path 226E are applied to an input port 2. Details of coupling arrangement 228 are illustrated in FIG. 2c.

FIG. 2c is a simplified block diagram of coupling arrangement 228 of FIG. 2a, and FIG. 3 represents a physical structure corresponding to that of FIG. 2c. Elements of FIGS. 2c and 3 corresponding to those of FIG. 2a are designated by the same reference numerals. Ideally, the odd- and even-mode signals applied to input ports 1 and 2, respectively, of coupling arrangement block 228 would be applied with equal phase to all of feedhorns 216b-216e. However, this ideal phase cannot be accomplished, for various reasons, including the difference in the frequencies passing through each channel, in that odd transmission path 226O carries frequency $f_1$ which is below frequency $f_2$, and also, if the number of odd and even channels is equal, channel $F_{2N+1}$ would not exist in which case, even channel 226E would carry frequency $f_{2N}$, which is above $f_{2N-1}$. As a result, an acceptable compromise has been found to be the application of signal to the feedhorns with monotonically changing phase shifts. The phase shifts are in mutually opposite direction for the two inputs. This results in a beam tilt, but the beam tilts are mutually opposite for the positive and negative phase shifts.

In FIG. 2c, input port 1 of coupling arrangement 228 is connected to a first input port $231^{I1}$ of a first 3dB, 90° hybrid or directional coupler 231. Input port 2 of coupler 228 is connected to a second input port $231^{I2}$ of coupler 231. Those skilled in the art are familiar with 3dB, 90° directional couplers or hybrids, and especially know that the 3dB and 90° values are only nominal, and that the actual values may differ depending upon conditions such as frequency and impedance. A first output port $231^{01}$ of hybrid 231 is coupled by a transmission path 244 to a first input port $232^{I1}$ of a second 3dB, 90° coupler 232. Second input port $232^{I2}$ of coupler 232 is terminated, as known, in a characteristic impedance, as illustrated by a resistor symbol. A second output port $231^{02}$ of coupler 231 is connected by a path 246 to a first input port $233^{I1}$ of another 3dB, 90° coupler 233. A second input port $233^{I2}$ of coupler 233 is terminated. A first output port $232^{01}$ of coupler 232 is connected by way of a transmission path 248 and a phase shifter 242 to first horn antenna 216b, which is part of antenna 16 of FIG. 2a. A second output port $232^{02}$ of coupler 232 is coupled by a path 250 to a first input port $234^{I1}$ of a fourth 3dB, 90° coupler 234. A first output port $233^{01}$ of coupler 233 is coupled by a path 252 to a second input port $234^{I2}$ of coupler 234. A second output port $233^{02}$ of coupler 233 is coupled by way of transmission path 254 and a phase shifter 246 to horn 216d.

A first output port $234^{01}$ of hybrid coupler 234 of FIG. 2c is coupled by way of a transmission path 256 and a phase shifter 244 to horn antenna 216c. Second output port $234^{02}$ of coupler 234 is coupled by path 258 to phase shifter 248. The crossover of inputs to phase shifters 246 and 248 is provided as described in more detail below in order to maintain a constant phase progression at the outputs of horns 216b-216e.

As mentioned above, a monotonic phase progression across the feed horn apertures is desired. This monotonic progression may result in a slight beam tilt (squint). As illustrated in the simplified arrangement of FIGS. 2a and 2c, four feed horns are involved, and the total phase progression across the four horns is 135°. A phase progression as large as 135° causes a substantial beam tilt, but the actual beam tilts may be smaller, because the horn-to-horn phase progression can be decreased by causing the illustrated phase change to occur across a number of horns larger than four. However, the use of four horns is sufficient to explain the invention.

In operation of the arrangement of FIG. 2c, the odd-mode signals applied to input port 1 of coupling arrangement 228 are applied to input port $231^{I1}$. One-half the signal power (−3dB or 0.707 amplitude) applied to input port $231^{I1}$ is coupled to output port $231^{01}$ with reference (/0°) phase, and the other half of the signal power is coupled to output port $231^{02}$ with a nominal 90 degree (/−90°) phase delay. The signal at output ports $231^{01}$ and $231^{02}$ of coupler 231 may be written as 0.707/0° and 0.707/−90°, respectively. Similarly, the even-mode channels applied to input port 2 of coupler arrangement 228 are applied to input port $231^{I2}$ of coupler 231, and are coupled, in equal amplitudes, to output port $231^{02}$ as 0.707/0°, and to output port $231^{01}$ with minus 90° phase (0.707/−90°). Thus, the signals arriving at first input ports $232^{I1}$ and $233^{I1}$ of couplers 232 and 233, respectively, each include a plurality of interleaved half-power odd and even frequency signal components. In FIG. 2c, phases, relative to the odd signals applied to input port 1 of coupling arrangement 228 from which they originate, of the signals which are produced at the various output ports of the couplers of FIG. 2c, are designated adjacent to the respective output ports. Also, the phases, relative to the even signals applied to input port 2 of coupling arrangement 228 from which they originate, of the signals which are produced at the various output ports of the couplers, are designated, in parentheses, adjacent to the respective output ports.

The interleaved frequency components (0.707/0° and 0.707/−90°) applied to input port $232^{I1}$ of coupler 232 of FIG. 2c are coupled with equal amplitudes to its output ports $232^{01}$ and $232^{02}$ with 0° and −90° phase, respectively. The interleaved frequency components (0.707/0° and 0.707/−90° applied to input port $233^{I1}$ of coupler 233 are coupled with equal amplitudes and corresponding phases to output ports $233^{01}$ and $233^{02}$. In this case, the reference-phase signal exiting from output port $233^{01}$ of coupler 233 has the same phase as the input signal, namely −90°, while the signal exiting output port $233^{02}$ has an additional 90° phase shift, for a total phase shift of 180°. Coupler 234 couples the signals applied to its input ports $234^{I1}$ and $234^{I2}$ to its output ports $234^{01}$ and $234^{02}$. The odd-mode signals originally coupled to input port 1 of coupling arrangement 228 are coupled to output ports $234^{01}$ and $234^{02}$ in equal amounts, whereby output port $234^{01}$ receives a first component at −90° from input port $234^{I1}$, and a second component of −90° from input port $234^{I2}$, which is phase shifted within coupler 234 by a further 90°, whereby the signal at output port $234^{01}$ of coupler 234 is the average of two equal-amplitude signals at −90° and 180°, which is −135°. Similarly, the odd components at output port $234^{02}$ of coupler 234 together produce a signal, the phase of which is the average of the −90° signal coupled from input port $234^{I2}$ and the −90° signal coupled from input port $234^{I1}$ with an additional 90° phase shift, which once again is the average of two signals at −90° and 180°, respectively, which is −135°. Thus, the odd-mode signals applied to input port 1 of coupler arrangement 228 produce equal amplitude, −135° phase signals at both output ports of coupler 234.

The even mode signals applied to input port 2 of coupling arrangement 228 of FIG. 2c arrive at input port $234^{I1}$ of coupler 234 with 180° phase shift and at input port $234^{I2}$ with 0° phase shift. The even-mode 180° phase signal arriving at input port $234^{I1}$ is coupled to output port $234^{01}$ without additional phase shift, and it is combined by the coupler action with the even-mode 0° signal applied to input port $234^{I2}$, to which a further 90° phase delay is imparted. Thus, the even-mode signal at output port $234^{01}$ of coupler 234 is the sum or combination of two equal-amplitude signals at 180° and −90°, which is −135° (indicated in parentheses adjacent to transmission path 256). The even-mode 180° component applied to input port $234^{I2}$ of coupler 234 is provided with an additional 90° phase shift or delay in its coupling to output port $234^{02}$, for a total of −270° or +90°, whereby the even frequency signal components at output port $234^{02}$ are at a phase which is the average of the +90° and 0° components, which is +45°, as indicated in parentheses adjacent transmission path 258.

The phases of the odd-mode signals originating at input port 1 of coupling arrangement 228 of FIG. 2c are 0°, −135°, −135°, and 180° at transmission lines 248, 256, 258 and 254, respectively. In order to achieve a monotonic horn-to-horn phase progression of 45°, the 0° signal on transmission line 248 is phase delayed by 45° in phase shifter 242, to a phase of −45°, and the −135° signal on transmission line 256 is phase advanced by 45° in phase shifter 244, to −90°. With only the additions of phase shifters 242 (−45°) and 244 (+45°)(i.e. without phase shifters 246 and 248), the odd-mode signals at the inputs of horns 216b, 216c, 216d and 216e would be placed in the phase −45°, −90°, −135°, −180°, respectively, which is the desired phase progression. However, the even-mode signals originating at input port 2 of coupling arrangement 228 of FIG. 2c would then have phases −135° at the output of phase shifter 242, −90° at the output of phase shifter 244, +45° at output port $234^{02}$ of coupler 234, and −90° at output port $233^{02}$ of coupler 233. The progression −135°, −90°, +45°, −90° for the even-mode signals is not the desired monotonic phase progression.

In order to achieve the desired monotonic phase progression of the signals radiated from antennas 216b–216e, output port $233^{02}$ of coupler 233 of FIG. 2c is coupled to phase shifter 246, and output port $234^{02}$ of coupler 234 is coupled to phase shifter 248. With this coupling, and with phase shifts of +45° for phase shifter 246 and −45° for phase shifter 248, the phase progression for the odd-mode signals be comes −45°, −90°, −135°, −180°, as indicated adjacent the outputs of phase shifters 242, 244, 246 and 248, respectively, and the corresponding even-mode signals are −135°, −90°, −45° and 0°, respectively. The indicated phases at the outputs of the horns, as indicated in tabular form in FIG. 2c under the heading "Mode" are normalized by the addition of 90°. The normalized progressions are 45°, 0°, −45°, −90° but in mutually opposite directions. Thus, the two phase progressions are monotonic and opposite. The coupling of output port $234^{02}$ of coupler 234 to phase shifter 248, and of output port $233^{02}$ of coupler 233 to phase shifter 246, is accomplished by means of a crossover arrangement illustrated as 240. When the described system is made with hollow waveguide, a crossover such as 240 may be a source of problem. The first aspect of the problem lies in the fact that one waveguide must cross the other in three dimensions, as at crossover region 240 of FIG. 3, which requires the equivalent of two E-plane and two H-plane (total of four) 90° waveguide elbows, each of which contributes an impedance mismatch. Thus, the VWSR of transmission line 254 may be greater than that of transmission line 258. Also, the length of transmission line 254 may be greater than the length of transmission line 248, leading to a need for a compensating phase shift or length of transmission line, which may introduce its own VSWR. Lastly, the crossover is a three dimensional device which is not amenable to ordinary fabrication techniques, but which requires special handling. Its cost may therefore be greater than if the structure were capable of lying in a plane as described below, and where the use of the structure of FIG. 2c is considered for spacecraft use, its weight may be greater than if a simple planar manufacturing technique were available, and its reliability may be inferior.

FIG. 4 is a simplified block diagram of a prior art coupling arrangement 428 which solves some of the abovementioned problems. Elements of coupling arrangement 428 corresponding to those of coupling arrangement 228 of FIG. 2c are designated by the same reference numerals. Coupling arrangement 428 of FIG. 4 differs from coupling arrangement 228 of FIG. 2c in that waveguide crossover 240 is replaced by zero-db hybrid or directional coupler 440. As illustrated in FIG. 4, zero-db coupler 440 includes a first input port $440^{I1}$ which is coupled to output port $234^{02}$ of 3dB hybrid 234, and a second input port $440^{I2}$ which is coupled to output port $233^{02}$ of 3dB coupler 233. Zero-dB coupler 440 also includes a first output port $440^{01}$ coupled to phase shifter 246, and a second output port $440^{02}$ coupled to phase shifter 248. Zero-db hybrid coupler 440 of FIG. 4 is a cascade of two 3dB hybrid couplers, with the output ports of one coupled to the input ports of the other.

FIG. 5 illustrates, in simplified block diagram form, a cascade of two 3dB hybrid or directional couplers 510 and 520 which may be used as zero-dB coupler 440 of FIG. 4. In FIG. 5, first and second input ports 501 and 502 of 3dB hybrid coupler 510 are arranged to receive signal. As illustrated in FIG. 5, only input port 501 receives a signal, with reference amplitude of unity and reference phase angle (1/0°). As is well known, hybrid coupler 510 couples a signal of amplitude $\sqrt{2}/2$ or 0.707, and reference phase (0.707/0°) to an output port 503, and another signal of the same amplitude, but phase delayed by 90° (0.707/−90°) to its output port 504. The two output signals of coupler 510 are applied as input signals to ports 511 and 512 of second hybrid coupler 520. The 0.707/0° input to port 511 produces a signal of 0.5/0° at output port 513 of coupler 520, and a second output of 0.5°/−90° at output port 514. The 0.707/−90° signal applied to input port 512 of coupler 520 produces a signal 0.5/180° at output port 513, and a signal 0.5/−90° at output port 514 of coupler 520. Thus, the signal exiting port 513 has two components, each with amplitude 0.5, and with relative phases of 0° and 180°. The components at output port 513 cancel The signal at output port 514, on the other hand, includes two components, each of amplitude 0.5 and phase −90°, which sum together to produce signal 1.0/−90°. The energy represented by the canceled components at output port 513 can be viewed as doubling the output power at port 514 from 0.7/−90° to 1.0/0°. It can be seen, therefore, that the cascade of two 3dB hybrid couplers couples the signal from input port 501 to output port 514 with a 90° phase shift. By symmetry, an input applied to input port 502 would appear at output port 513 with a corresponding phase shift. These fixed phase shifts are readily compensated for by appropriate selection of phase shifters 242–248 of FIG. 4.

The use of a zero-dB coupler using two 3-db hybrids solves the crossover and planar manufacture problems, but has been found to be limited in bandwidth.

SUMMARY OF THE INVENTION

A zero-dB hybrid or directional coupler according to the invention includes first, second, third and fourth ports. A transmission line extends from the first port to the third port, and a second transmission line, parallel to the first transmission line, extends from the second port to the fourth port. A coupling arrangement couples signals which are applied to the first port to the fourth port and not to the second or third ports (within the limits of isolation), and couples signals which are applied to the second port to the third port and not to the first or fourth ports. In an embodiment of the zero-dB coupler, the first and second transmission lines are rectangular waveguides, and the coupling arrangement includes a plurality of branch waveguides extending between the first and second waveguides. In another embodiment of the invention, the transmission lines are coaxial. Lower loss is exhibited when the number of branch circuits or transmission lines is an odd integer rather than the next larger even integer. Particular impedances or admittances of the branch transmission lines relative to the through transmission lines, compensated for tee junction effects, provide optimized performance.

DESCRIPTION OF THE INVENTION

Figure 5:
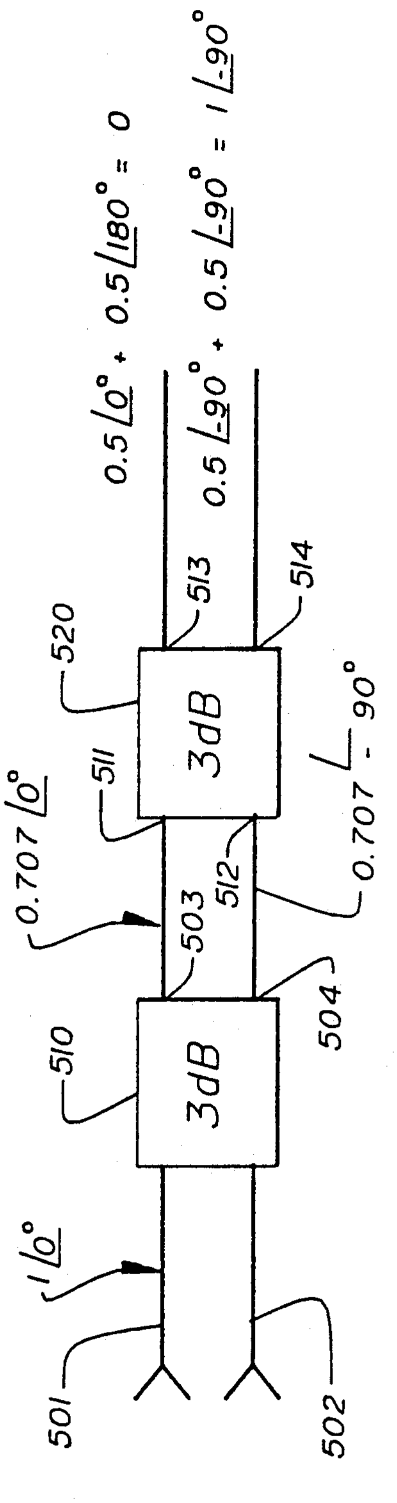
FIG. 5 PRIOR ART
FIG. 5 is a simplified block diagram illustrating a conceptual functional view of a prior art zero-db coupler according to the invention.

When couplers 510 and 520 of FIG. 5 are implemented as branch waveguide directional couplers, each one may have an integer number of branches such as 3, 4, . . . The cascade illustrated in FIG. 5, therefore, will have twice as many branches, and therefore, the number of branches in such a cascade is always an even integer. According to an aspect of the invention, two 3-branch, 3dB hybrids such as those of FIG. 5 are combined into a common structure, in which the adjacent branches of couplers 510 and 520 are merged into a single branch. This reduces the number of waveguide branches, and results in a total number of branches which is odd rather than even. It has been discovered that, when optimized, such an odd-branch zero-dB coupler has increased bandwidth, and reduced loss. This may be understood by considering that each branch of a directional or hybrid coupler corresponds to a tuned circuit, and that the bandwidth of the coupled tuned circuits is increased and the loss decreased by reducing the number of coupled elements.

Figure 6:
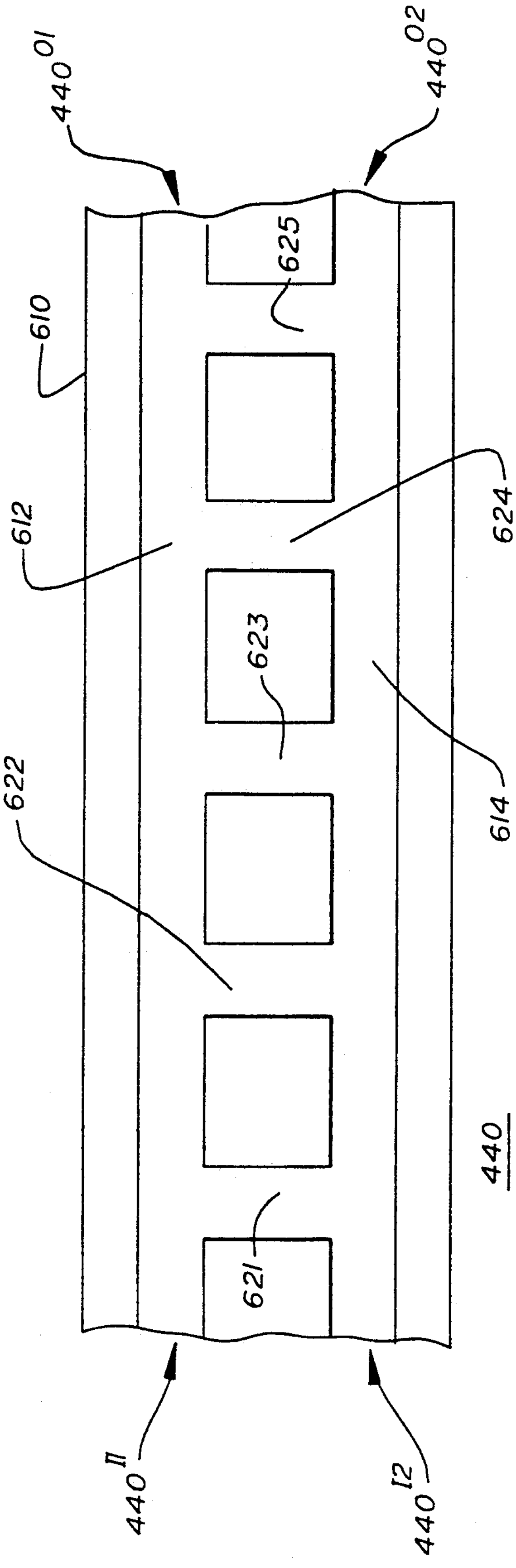
FIG. 6 is a plan view of a portion of an embodiment of a zero-db coupler in accordance with the invention, fabricated in the form of a milled slab of conductive material.

FIG. 6 illustrates a simplified monolithic structure of the general type well known in the art and which is described, for example, in U.S. Pat. No. 4,906,952, issued Mar. 6, 1990 in the name of Praba et al. The structure illustrated in FIG. 6 is a portion of a monolithic slab made from an electrically conductive material such as a slab of aluminum, milled or otherwise formed to define a pair of mutually parallel rectangular waveguide channels 612 and 614, the ends of which define ports $\mathbf{440}^{I1}$, and $\mathbf{440}^{01}$, and ports $\mathbf{440}^{I2}$ and $\mathbf{440}^{02}$, respectively. Five rectangular channels or branch waveguides extend between channels 612 and 614. These five channels are designated 621, 622, 623, 624 and 625. Center branch waveguide 623 is the combined branch. The lengths of the five branch waveguides are about $\lambda/4$, as well known in the art.

Figure 7A:
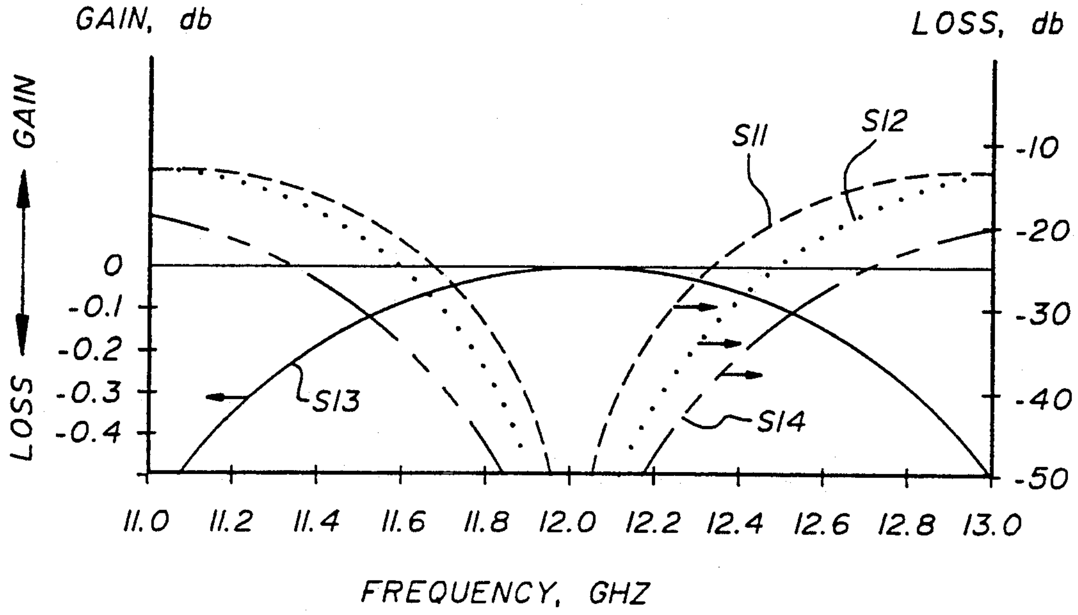
FIG. 7a represents calculated plots of the performance prior art coupler arrangement as described in FIG. 5.
Figure 7B:
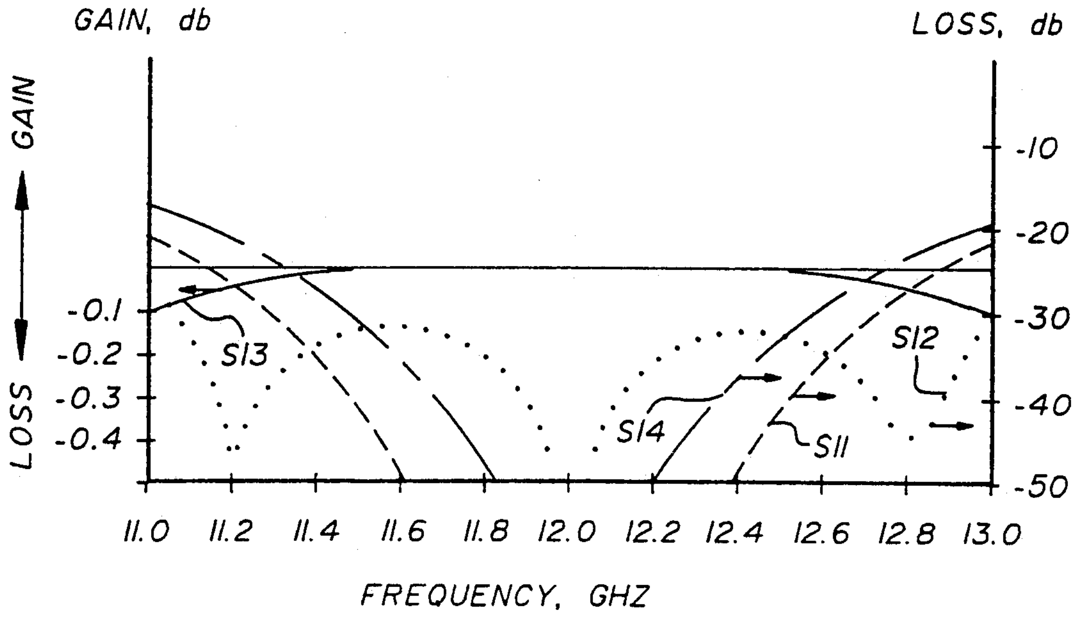
FIG. 7b represents calculated plots of the performance of a corresponding coupler according to the invention as described in FIG. 6.

FIG. 7a plots calculated gain (S13) versus frequency for a pair of 3-branch directional couplers arranged as in FIG. 5, over a frequency range of 11.0 to 13.0 $GH_z$. Since the device is passive, its gain is negative, which is also known as a loss. Also plotted in FIG. 7a are S11, the return loss at port 501 (a measure of the impedance match), and also S12 and S14, which represent the isolation between input port 501 and ports 502 and 502, respectively. FIG. 7b illustrates corresponding plots for a five-branch zero-db coupler such as that of FIG. 6, optimized for operation within the frequency range. As illustrated, the through loss (S13) is improved (reduced) over a wider bandwidth than for the cascade of 3db couplers, and the input impedance S11 and isolated-port coupling S12, S14 remain low. The particular zero-dB coupler on which the measurements of FIG. 7b were made is described in detail in conjunction with FIG. 11.

Those skilled in the art recognize that the mutually "isolated" ports (i.e. ports $\mathbf{440}^{01}$ and $\mathbf{440}^{I2}$ when $\mathbf{440}^{I1}$ is the input) are only nominally isolated, and that the degree of isolation depends upon the operating frequency relative to the design center frequency, the accuracy of fabrication, skin depth of the conductor, and the like.

The impedance Z of a rectangular waveguide is determined by its broad "a" cross-sectional dimension and its narrow "b" dimension using the equation $$Z = \eta \frac{b}{a\sqrt{1-(\lambda/2a)^2}} \quad (1)$$

where $\eta$ is free-space impedance of 377 ohms; and $\lambda$ is free-space wavelength at the center operating frequency.

It has been discovered that the optimized zero-dB coupler has a unique set of branch-line impedances (normalized to the through-line impedance). For an optimized five-branch, series-junction coupler such as a branch waveguide coupler, given a normalized through-line impedance of 1.000, the center branch has an impedance of 0.8720, the two outside branches each have impedance of 0.3520, and the two intermediate branches (the branch lying between the center and an outside branch) each have impedance of 0.7415. An unoptimized arrangement, corresponding to two 3 dB hybrid couplers, each with one of its outside branches joined to the other, has outside branch impedance of 0.4142, center branch impedance of 0.8280 (as a result of combining two outside branches), and intermediate branch impedance of 0.7071.

Figure 1:
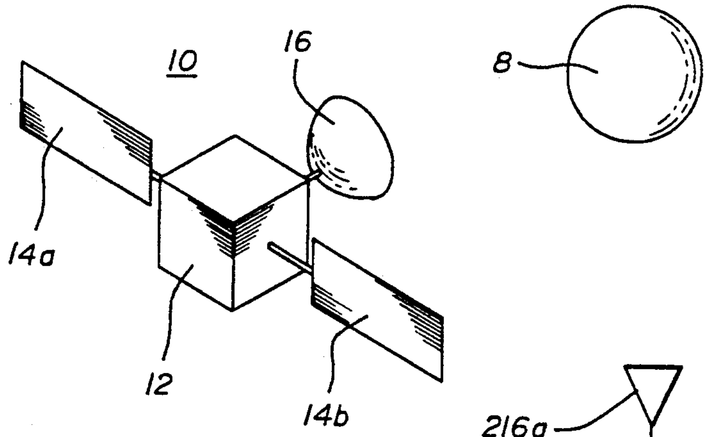
FIG. 1 PRIOR ART
FIG. 1 is a simplified perspective or isometric view of a spacecraft in orbit about a heavenly body.
Figure 2A:
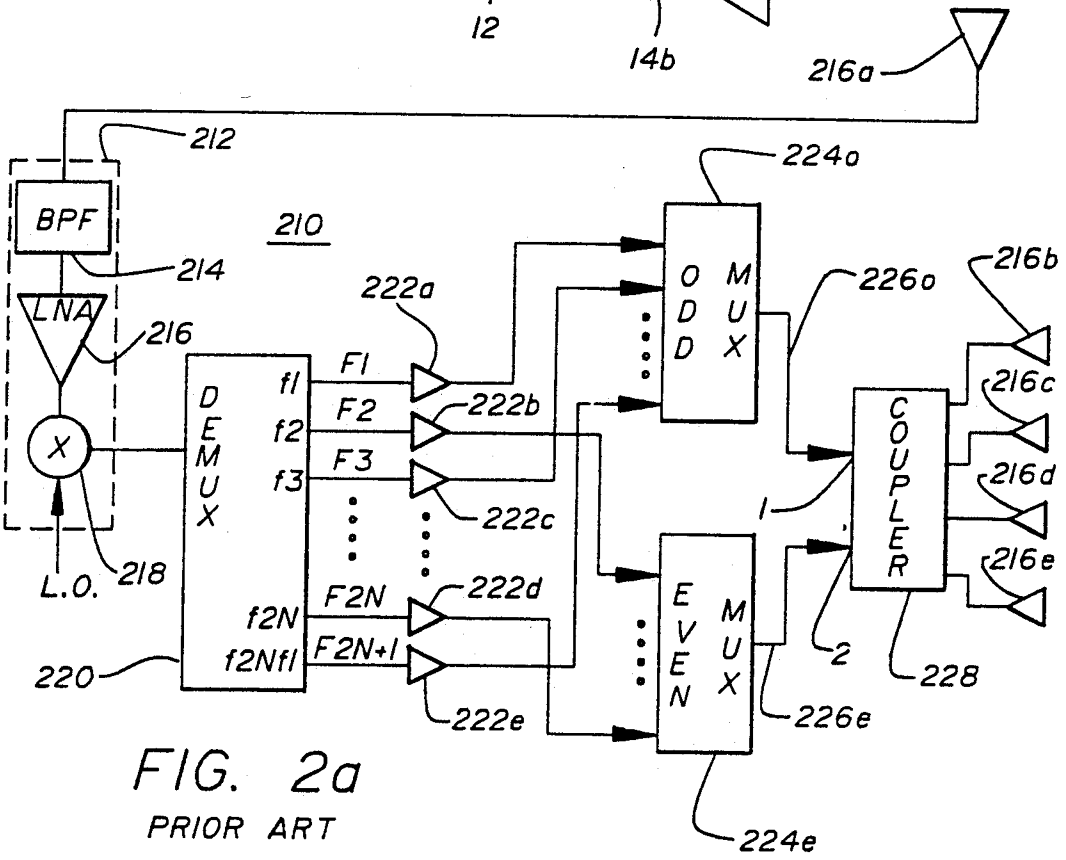
FIG. 2a PRIOR ART
FIG. 2a is a simplified block diagram of a portion of a prior art communication system which may be used with the spacecraft of FIG. 1.
Figure 2B:
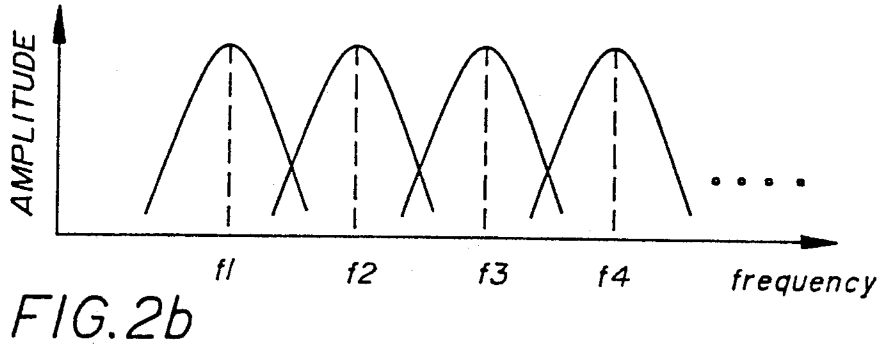
FIG.2b PRIOR ART
FIG. 2c is a simplified block diagram of a portion of the structure of FIG. 2a, and FIG. 2b is a simplified amplitude-versus-frequency plot of signals in the structure of FIG. 2c, FIGS. 2a, 2b, and 2c together referred to as FIG. 2.
Figure 2C:
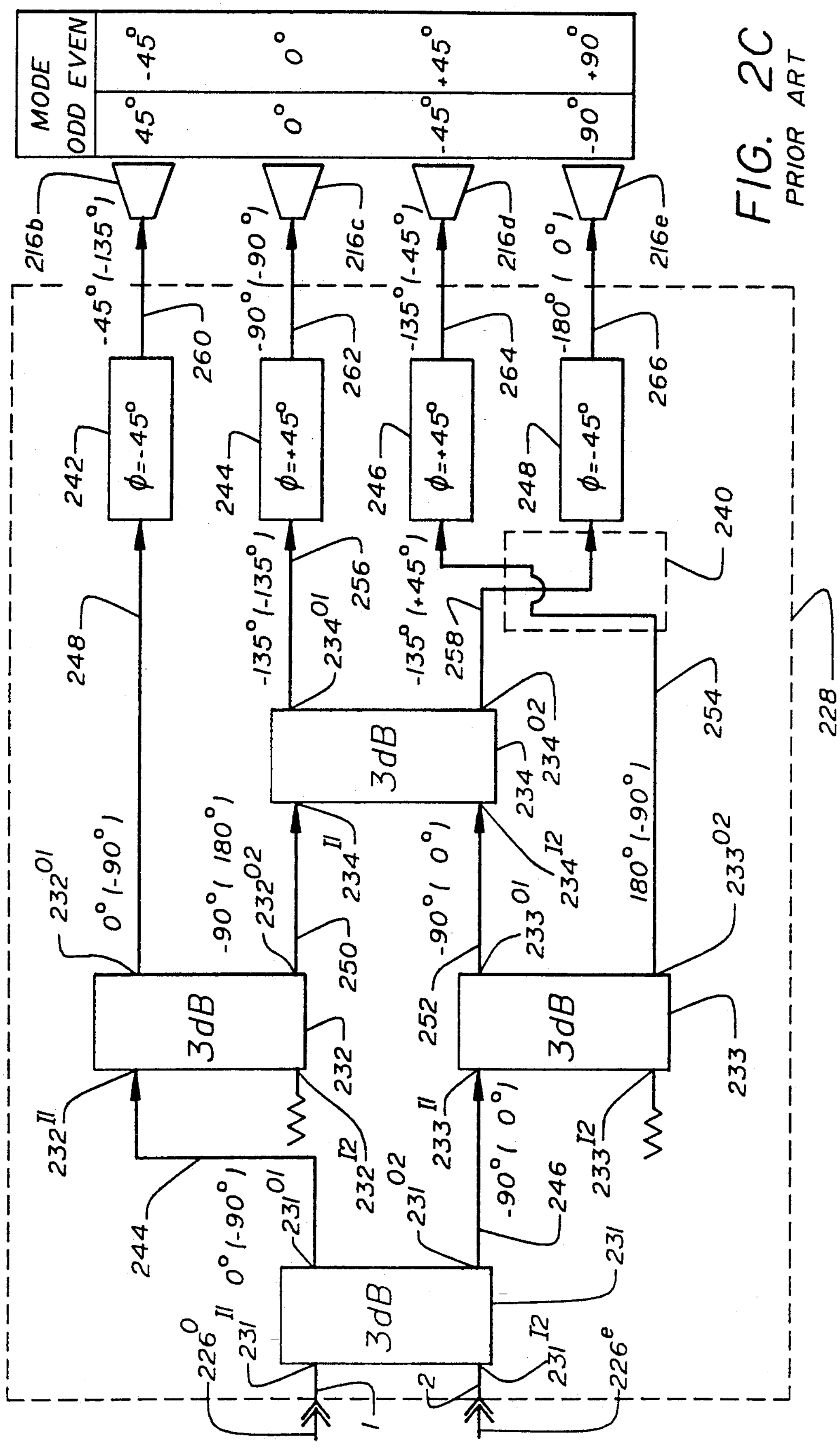
FIG. 2C PRIOR ART
Figure 3:
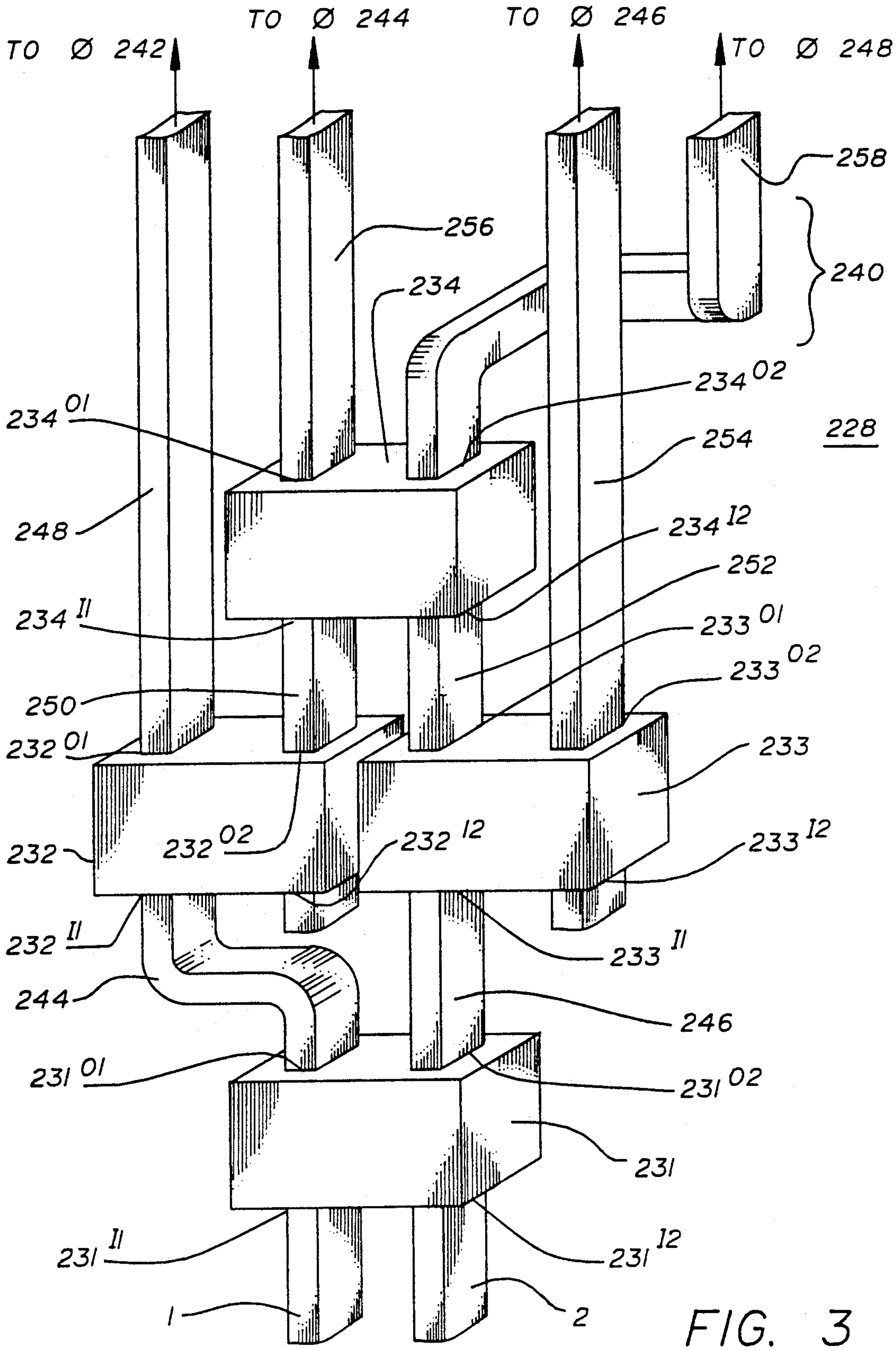
FIG. 3 ( PRIOR ART )
FIG. 3 is a simplified perspective or isometric view of the structure of FIG. 2c laid out in a substantially planar form, illustrating a crossover.
Figure 4:
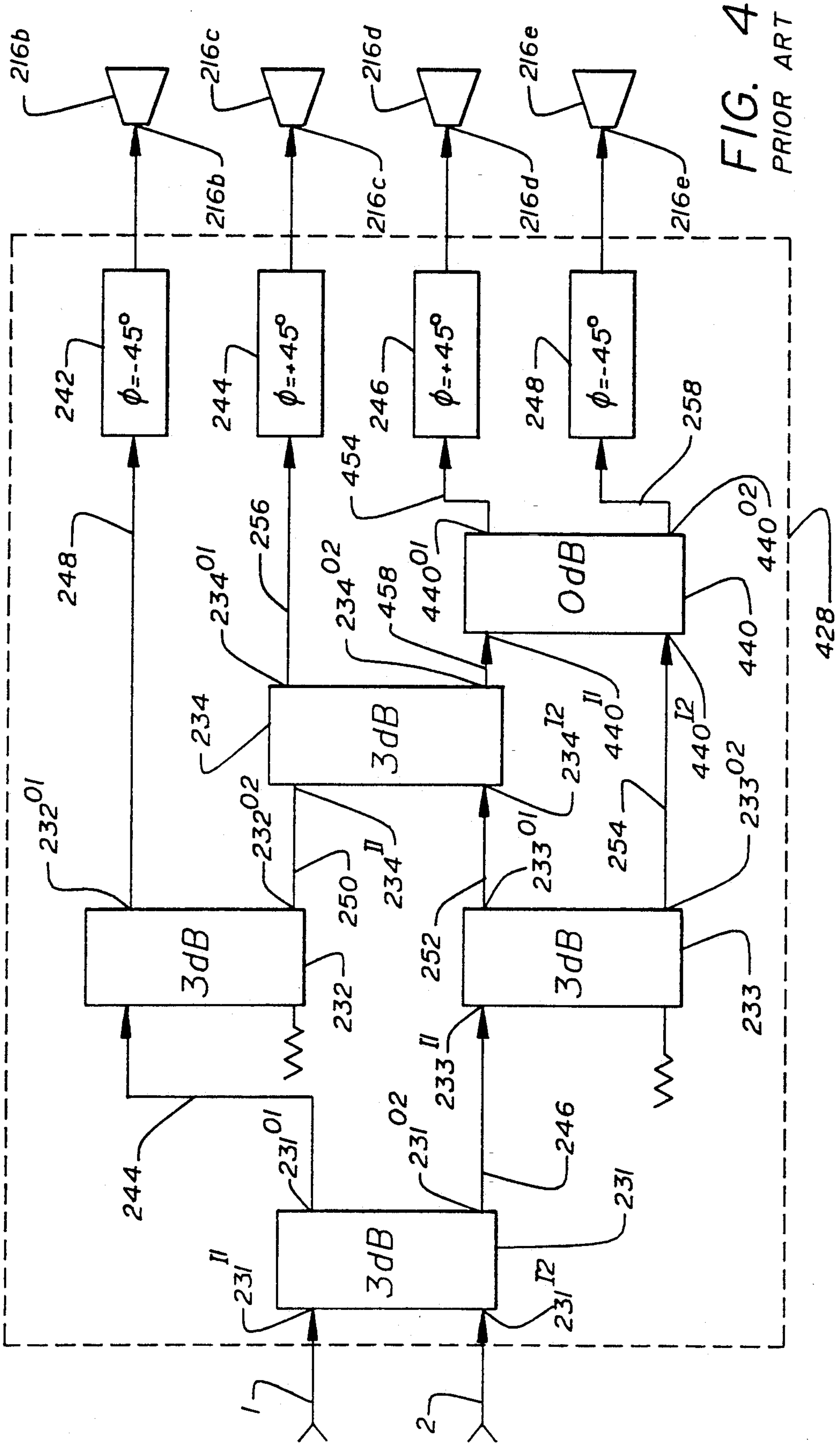
FIG. 4 PRIOR ART
FIG. 4 is a simplified block diagram of a prior art coupling arrangement, including a zero-db coupler in accordance with the invention, which may be substituted for the coupling arrangement of FIG. 2c.
Figure 8:
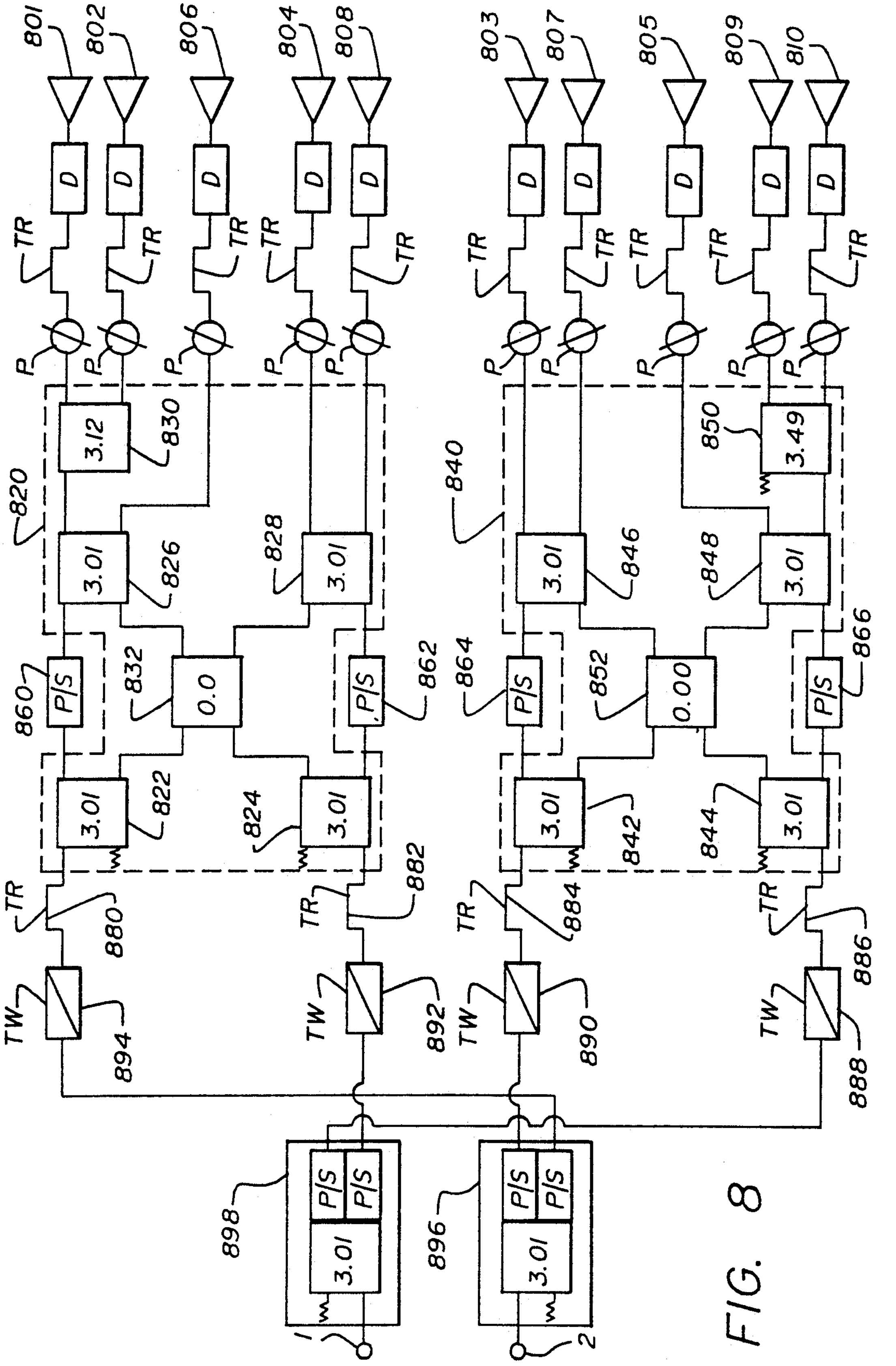
FIG. 8 is a simplified block diagram of a portion of a spacecraft communication system which uses the invention, as actually designed for use.

FIG. 8 is a block diagram of the horizontal polarization portion of a transmit beam forming network (corresponding to coupler 228 and antennas 216*b*–216*e* of FIG. 2*a*) designed for the Ku band antenna of Telstar 4. In FIG. 8, blocks designated "3.01", "3.12", and "3.49" are hybrid or directional couplers having coupling factors in (dB) corresponding to the designation numerals, and the blocks designated "0.0" are zero-dB couplers. Blocks designated P/S are phase equalizer/shifters, blocks designated TW are waveguide twists, bends designated TR are trombone sections, the $\phi$ symbols designated P represent phase shifters, and blocks designated D are diplexers which couple transmit signals to the antennas and received signals from the antennas to a receiver arrangement (not illustrated), antennas 801 and 810 are trifurcated feed horns, and the remainder of antennas 802–809 are feedhorns.

In the particular satellite arrangement, antenna 801 is directed toward Puerto Rico and the Virgin Islands, antenna 810 is directed toward Hawaii, and antennas 802 and 803 are directed toward the eastern continental United States (CONUS). Antennas 804 and 805 are directed towards east central CONUS, 806 and 807 are for west central CONUS, and 808 and 809 are for west CONUS.

In FIG. 8, blocks 820 and 840, defined by dashed lines, represent portions of the structure which are formed as monolithic units, much as described in the aforementioned Praba et al. patent and in conjunction with FIG. 6. Monolithic unit 820 includes 3dB couplers 822, 824, 826 and 828, a 3.12dB coupler 830, and a zero dB coupler 832. A phase equalizing phase shifter 860, which is not part of monolithic network 820, is coupled between 3dB couplers 822 and 826. A similar phase shifter 862 is coupled between directional couplers 824 and 828. Monolithic structure 840 of FIG. 8 is similar, except that its directional coupler 850 has a coupling factor of 3.49dB rather than 3.12dB as does coupler 830.

Figure 9:
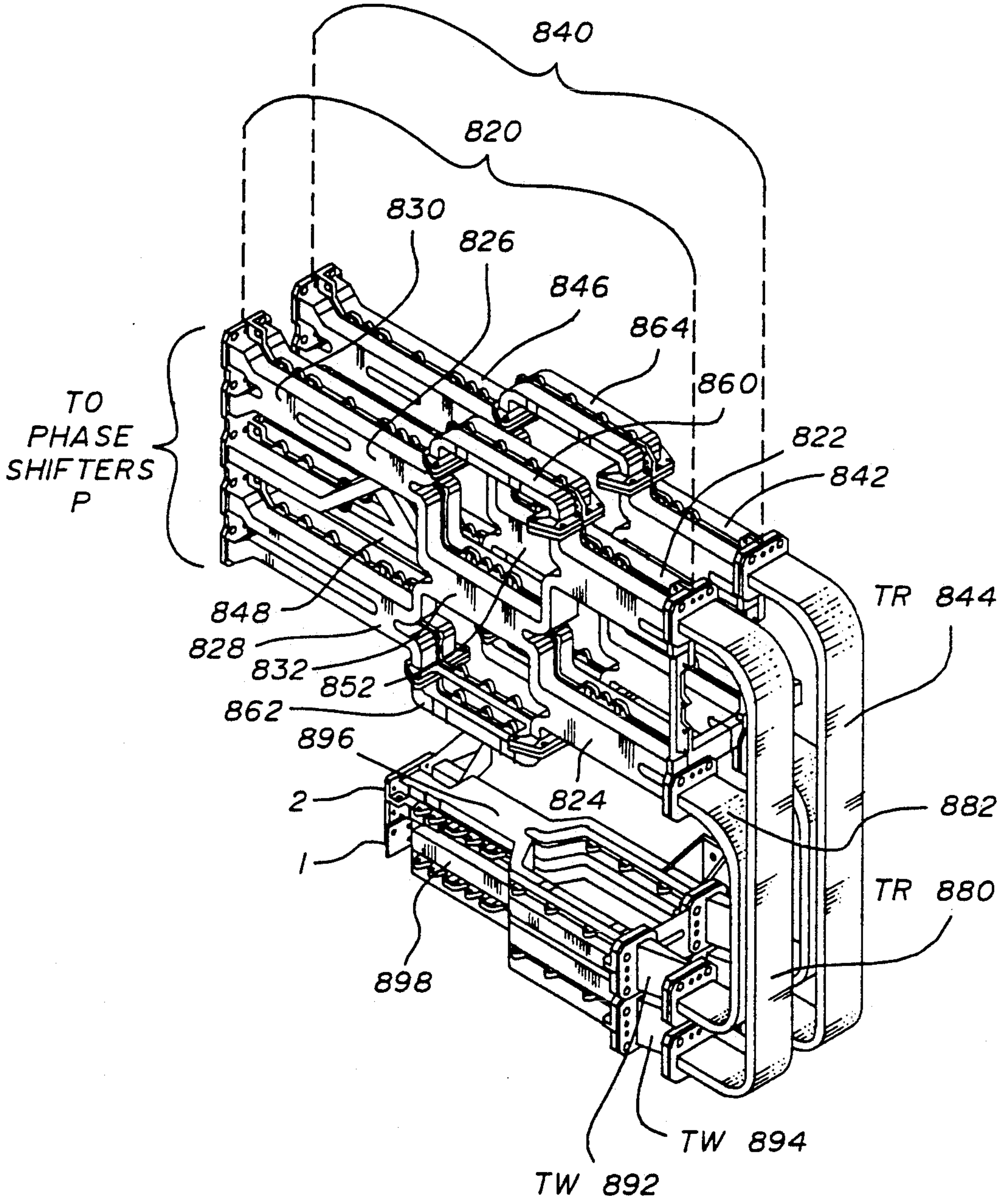
FIG. 9 is a perspective or isometric view of the physical structures corresponding to a major portion of the system of FIG. 8, and shows a monolithic structure, in two halves, which include a zero-dB hybrid.

FIG. 9 illustrates the physical structure corresponding to portions of FIG. 8. In FIG. 9, elements corresponding to those of FIG. 8 are designated by the same reference numerals. In FIG. 9, waveguides are half-height rectangular WR75 for operation in the general range of 10 to 15 $GH_z$. Half-height WR75 has a height of about 0.20 inch and a width of about 0.75 inch. As illustrated, both units 820 and 840 are planar (that is, their parting lines each lie in a plane) and located side-by-side, and each is made up a bipartite monolithic structure joined along the central parting line or seam.

Figure 10:
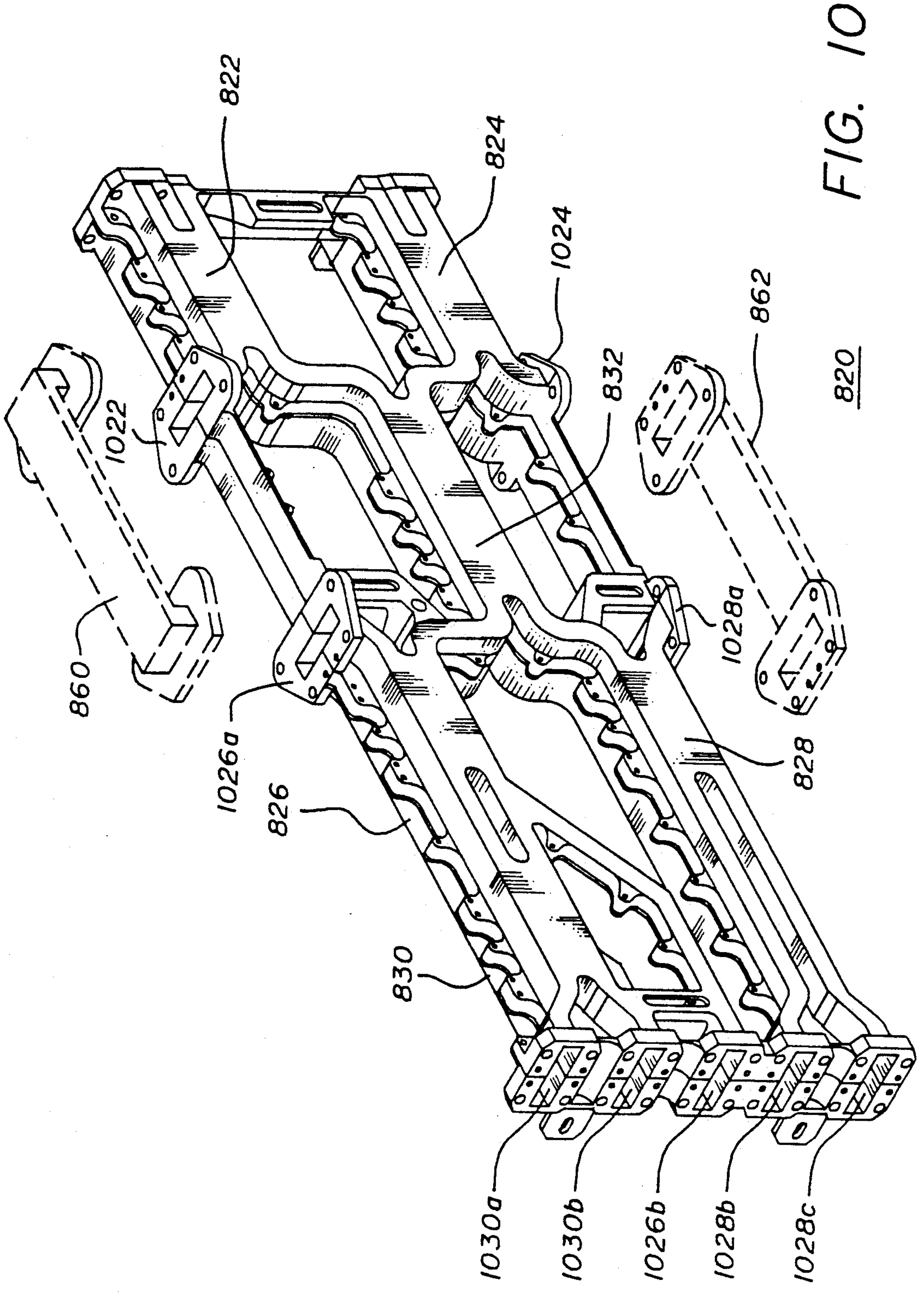
FIG. 10 is a perspective or isometric view of the bipartite monolithic structure portion of FIG. 9.

FIG. 10 is a perspective or isometric view of a monolithic structure 820 of FIGS. 8 and 9. Elements of FIG. 10 corresponding to those of FIGS. 8 and 9 are designated by the same reference numerals. In FIG. 10, phase shifter 860 (illustrated in phantom) is coupled to an output port 1022 of 3.01dB hybrid coupler 822, and to an input port 1026*a* of 3.01dB coupler 826. Phase shifter 862, also illustrated in phantom, is adapted to couple to an output port of 3.01dB coupler 824 at flange 1024 and at flange 1028*a* to an input port of 3.01dB coupler 828. Port 1026*b* is an output port of 3.01dB coupler 826, and ports 1028*b* and *c* are output ports of 3.01dB coupler 828.

Figure 11:
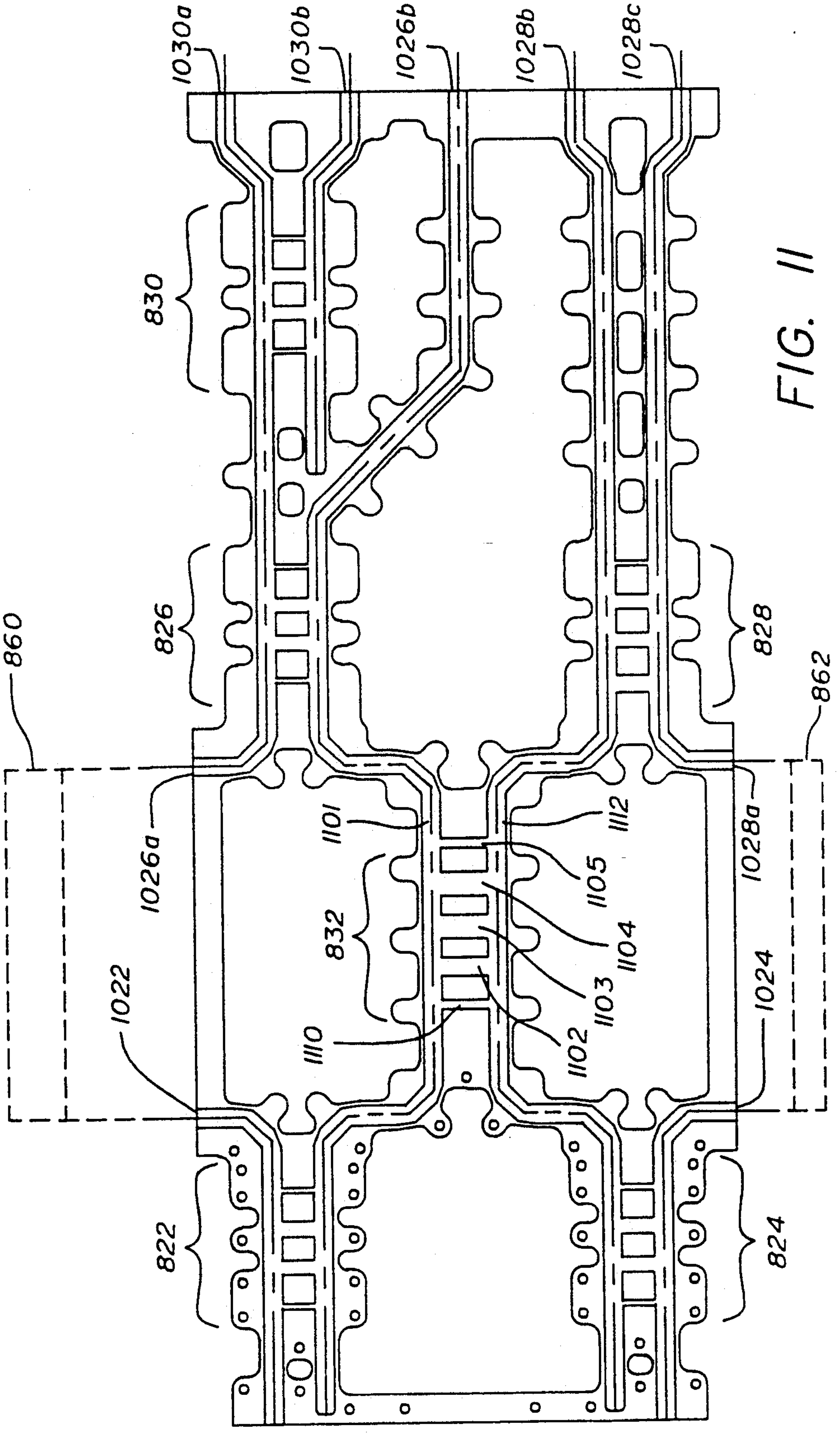
FIG. 11 is a plan view of the interior of one half of the monolithic structure of FIG. 10.

FIG. 11 is an internal view of the structure of FIG. 10, illustrating the regions in which branch waveguides occur. The same reference numerals are used as in FIGS. 8 and 10. The branch waveguide structure of couplers 822, 824, 826, 828 and 830 is well known.

In FIG. 11, zero-dB coupler 832 has five branch waveguides 1101, 1102, 1103, 1104, and 1105, which extend between through waveguides 1110, 1112, as described in conjunction with FIG. 6. The widths (not visible in FIG. 11) of the branch waveguides are the same as the widths of the through waveguides, namely 0.75 inch. The heights of the branch waveguides (the dimension parallel to the direction of elongation of through waveguides 1110 and 1112) are selected to optimize the coupling. End branch waveguides 1101 and 1105 have equal heights of 0.0733 inch. Center branch waveguide 1103 has height of 0.1905 inch, and intermediate branch waveguides 1102, 1104 have equal heights of 0.1599. Measured center-to center, intermediate branch waveguides 1102, 1104 are each spaced 0.329 inch from the center of center branch waveguide 1103, and end branch waveguides 1101 and 1105 are spaced 0.654 inch therefrom. The length of the branch waveguides (i.e. the distance between the nearest faces of through waveguides 1110 and 1112) is 0.273 inch. The transverse physical dimensions of the branch waveguides deviate slightly from the calculated optimum values by virtue of well-known corrections for tee junction effects. Similarly, the tee junction effects cause the lengths of the various waveguides to deviate slightly from $\lambda/4$. These effects cause relative impedance variations of about 5%. The measured performance of this zero-dB coupler is in general agreement with the plots calculated of FIG. 7*b*.

Other embodiments of the invention will be apparent to those skilled in the art. While waveguide transmission lines have been described for use in a zero-dB coupler using series waveguide junctures, the same principles may be applied to coaxial transmission line couplers. Since, in a coaxial branch coupler, the transmission-line junctions are parallel rather than serial, admittances are used instead of impedances, and the optimized normalized branch admittances are: center branch 0.8720; outside branch 0.3520, and intermediate branch 0.7415.

What is claimed is:

1. A zero-dB branch transmission-line directional coupler, comprising:

a first elongated main transmission line having one of a normalized impedance and a normalized admittance of unity at a particular frequency;

a second elongated main transmission line parallel with said first main transmission line, said second main transmission line also having one of an impedance and admittance, said one of said impedance and admittance of said second main transmission line being equal to a corresponding one of said impedance and admittance of said first main transmission line at said particular frequency;

a first branch transmission line extending between first locations along said first and second main transmission lines and forming first junctions therewith, said first branch transmission line having an electrical length of about one quarter wavelength at said particular frequency;

second and third branch transmission lines extending, parallel with said first branch transmission line, between second and third locations along said first and second main transmission lines and forming second and third junctions therewith, with said first junctions of said first branch transmission line being located on said first and second main transmission lines between said second and third junctions of said second and third branch transmission lines;

fourth and fifth branch transmission lines extending, parallel with said first branch transmission line, between fourth and fifth locations along said first and second main transmission lines and forming fourth and fifth junctions therewith, said fourth junctions of said fourth branch transmission line being located on said first and second main transmission lines between said first and second junctions of said first and second branch transmission lines, and said fifth junctions of said fifth branch transmission line being located on said first and second main transmission lines between said first and third junctions of said first and third branch transmission lines;

said first branch transmission line having said one of said normalized impedance and said normalized admittance of about 0.87 at said particular frequency;

said second and third branch transmission lines each having said one of said normalized impedance and said normalized admittance of about 0.35 at said particular frequency; and said fourth and fifth branch transmission lines each having said one of said normalized impedance and said normalized admittance of about 0.74 at said particular frequency.

2. A coupler according to claim 1 wherein the spacing of said first branch transmission lines relative to each of said fourth and fifth branch transmission lines, respectively, is about one quarter wavelength at said particular frequency.

3. A coupler according to claim 1 wherein said transmission lines are hollow rectangular waveguides, and said junctions are series junctions.

4. A zero dB branch-line waveguide coupler, comprising:

a first elongated rectangular main waveguide including mutually parallel broad electrically conductive walls spaced apart by mutually parallel narrow electrically conductive walls, and defining a first axis of elongation, said first waveguide having a normalized impedance of unity at a particular frequency;

a second elongated rectangular main waveguide, parallel with said first, said second main waveguide including mutually parallel broad electrically conductive walls spaced apart by mutually parallel narrow electrically conductive walls, and defining a second axis of elongation, said second waveguide having an impedance equal to the impedance of said first waveguide at said particular frequency;

a first rectangular branch waveguide coupled to and extending between particular broad walls of said first and second main waveguides, said first branch waveguide defining a third axis, and having a length of about one quarter wavelength in the direction of said third axis, and a normalized impedance of about 0.87 at said particular frequency;

second and third rectangular branch waveguides coupled to and extending between said broad walls of said first and second main waveguides at locations on opposite sides of, and spaced from, said first branch waveguide, said second and third rectangular branch waveguides being mutually identical and defining fourth and firth axes, respectively, said second and third rectangular branch waveguides having a length of about one quarter wavelength in the direction of said third and fourth axes, respectively and each having a normalized impedance of about 0.35 at said particular frequency; and fourth and fifth rectangular branch waveguides coupled to and extending between said particular broad walls of said first and second main waveguides at locations between said first and second, and about halfway between said first and third branch waveguides, respectively, said fourth and fifth branch waveguides being mutually identical and defining sixth and seventh axes, respectively, each of said fourth and fifth branch waveguides having a length of about one quarter wavelength and a normalized impedance of about 0.74 at said particular frequency.

5. A spacecraft communications system, comprising:

receive antenna means for receiving uplink signals;

receiving means coupled to said receive antenna means for receiving said uplink signals therefrom, for at least filtering said uplink signals to generate received signals;

demultiplexing means coupled to said receiving means for separating said received signals into a plurality of frequency channels;

amplifying means coupled to said demultiplexing means for amplifying the signals in at least two of said channels for forming amplified signals;

first and second multiplexing means coupled to said amplifying means for coupling signals in said two of said channels onto first and second different paths;

transmit antenna means including at least first, second and third input ports arranged at positions centered on a plane, for transmitting signals applied in a particular spatial phase relation to said first, second and third input ports of said transmit antenna means;

planar dual-mode coupling means coupled to said first and second paths for coupling said signals in said first and second paths together for forming signals to be transmitted, said dual-mode coupling means also including first, second and third output ports at which said signals to be transmitted appear, said first, second and third output ports arranged at positions centered on said plane with the phases of two adjacent ones of said first, second and third output ports reversed in said positions from said particular spatial phase relation; and zero-dB coupling means, said zero-dB coupling means including:

a first elongated main transmission line having one of a normalized impedance and a normalized admittance of unity at a particular frequency, and defining first and second ports, a first port of which is coupled to one of said two adjacent ones of said first, second and third output ports of said dual-mode coupling means;

a second elongated main transmission line parallel with said first transmission line, said second main transmission line also having said one of an impedance and admittance, said one of said impedance and admittance of said second transmission line being equal to a corresponding one of said impedance and admittance of said first main transmission line at said particular frequency, and defining first and second ports;

a first branch transmission line extending between first locations along said first and second main transmission lines and forming first junctions therewith, said first branch transmission lines having a length of about one quarter wavelength at said particular frequency;

second and third branch transmission lines extending, parallel with said first branch transmission line, between second and third locations along said first and second main transmission lines and forming second and third junctions therewith, with said first branch transmission line located between said second and third branch transmission lines;

fourth and fifth branch transmission lines extending, parallel with said first branch transmission lines, between fourth and fifth locations along said first and second main transmission lines and forming fourth and fifth junctions therewith, said fourth branch transmission line being located between said first and second branch transmission lines, and said fifth branch transmission line being located between said first and third branch transmission lines;

said first branch transmission line having said one of said normalized impedance and normalized admittance of about 0.87 at said particular frequency;

said second and third branch transmission lines each having said one of said normalized impedance and normalized admittance of about 0.35 at said particular frequency; and said fourth and fifth branch transmission lines each having said one of said normalized impedance, and normalized admittance of about 0.74 at said particular frequency.

6. A system as in claim 5, wherein said main and branch transmission lines are rectangular waveguides, and said junctions are series junctions.

7. A system as in claim 6, wherein said main and branch waveguides are in the form of a bipartite monolithic whole.

* * * * *